Sept. 29, 1970          A. FISCHER          3,531,068

ANCHORING ELEMENT

Filed July 22, 1968

Inventor:
ARTUR FISCHER

By: Michael S. Striker
Attorney

United States Patent Office 3,531,068
Patented Sept. 29, 1970

3,531,068
ANCHORING ELEMENT
Artur Fischer, Grunmettstetterstrasse 133,
Tumlingen, Germany
Filed July 22, 1968, Ser. No. 746,399
Claims priority, application Germany, July 29, 1967,
F 53,097
Int. Cl. G05d 19/00
U.S. Cl. 248—15                                3 Claims

ABSTRACT OF THE DISCLOSURE

An anchoring element for anchoring to a support structure objects which are subject to vibratory movements. Two sleeves are arranged concentrically within one another with the outer sleeve adapted to be introduced into a hole provided in the support structure and the inner sleeve having an axially bore into which a fastening element can be threaded for connecting to the inner sleeve the object which is subject to vibratory movement. Elastically yieldable webs extend across the clearance between the inner and outer sleeve connecting the two together with freedom of elastic movement relative to one another.

BACKGROUND OF THE INVENTION

The present invention generally to an anchoring element, and more particularly to an anchoring element for anchoring one discrete object to another in such a manner as to preclude the transmission of vibrations therebetween.

It is well known that when anchoring objects or articles to one another of which one is subject to vibratory movements, an effort is usually made to prevent the vibratory movement from being transmitted from one to the other. For example, when machines are anchored to another object or to a support structure, such as a wall, or a floor, or the like, which machines are either subject to vibratory movements or will themselves produce such vibratory movements during operation, elastic mountings are used to prevent the transmission of such vibratory movements from the machine to the other object or support structure. These elastic mountings, which serve to dampen the vibrations, are capable of fulfilling their intended purpose but suffer from the disadvantage that it is not possible to connect them directly with the two objects, or the object and the support structure. Accordingly, there is no direct connection between the machine or other vibratory object and the second object or support structure and separate connecting elements must be uilized for effecting such connection between the respective objects, or the object and the support structure and the vibration-dampening mounting.

It is an object of the present invention to overcome this disadvantage.

More particularly, it is an object of the present invention to provide a vibration-damping anchoring element which permits direct anchoring connection of a vibratory object with another object or support structure and which simultaneously provides for the damping of vibrations of even large amplitude.

SUMMARY OF THE INVENTION

In accordance with the above objects, and others which will become apparent hereafter, one feature of my invention resides in the provision of an anchoring element, particularly an anchoring element which is suitable for anchoring one discrete object to another in such a manner as to preclude the transmission of vibrations therebetween. My novel anchoring element includes an outer part which is adapted to be rigidly connected with one of the objects, and an inner part telescoped with clearance into the outer part and adapted to be rigidly connected with the other of said objects. Further, my novel anchoring element includes elastically yieldable web means extending across the clearance between the inner and outer parts and connecting one of the parts to the other with freedom of elastic movement relative thereto.

By using my novel anchoring element I am able to anchor a vibratory object to another object or a support structure, directly and without the need for additional connecting elements, but without establishing a direct motion-transmitting connection between the two anchored-together objects. Thus, vibrations produced by one of the objects are damped by provision of the elastically yieldable web means and cannot be transmitted—or at least cannot be transmitted to any significant extent—to the other object or support structure to which the vibration-producing object is connected.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 2:
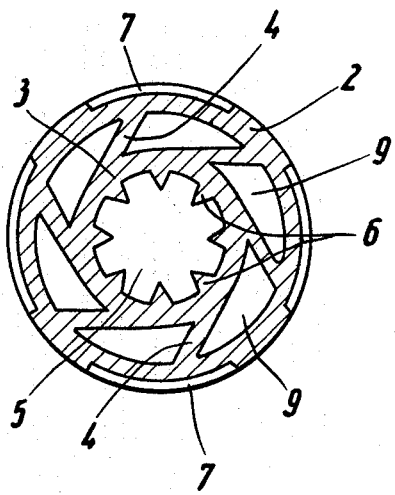
FIG. 2 is a section taken on the line II—II of FIG. 1.

Discussing now the drawing in detail, it will be seen that the novel anchoring element is generally identified with reference numeral 1 and comprises an outer part 2 and an inner part 3 which is telescoped within the outer part with clearance. In the illustrated embodiment the inner part 3 is received concentrically within the outer part 2 and both parts are of substantially circular cross-sectional outline, as shown clearly in FIG. 2. A plurality of circumferentially distributed elastically yieldable webs extend across the clearance between the inner and the outer part, connecting the inner and the outer parts together. In the illustrated embodiment, in which the cross-sectional outline of both parts is circular, the webs 4 extend tangentially with reference to at least one of these parts, and of course they extend in longitudinal direction of both parts 2 and 3.

The inner part 3 is provided with an axially extending passage or bore 5 into which a fastening member, such as a screw, may be introduced from the open end of the inner part 3 for the purpose of anchoring to the latter the vibratory object (which is not illustrated). The inner circumferential surface bounding the passage 5 is provided with longitudinally extending ribs 6, thus making it possible to utilize a wood screw or sheet metal screw which will then cut its own threads into the ribs 6 as it is threaded into the passage 5. Evidently, it is possible to provide threads during manufacture of the anchoring element 1, but the fact that in accordance with the invention they may also be omitted makes it possible to further simplify the already simple manufacture and construction of my anchoring element and thereby will make the anchoring element even less expensive.

Figure 1:
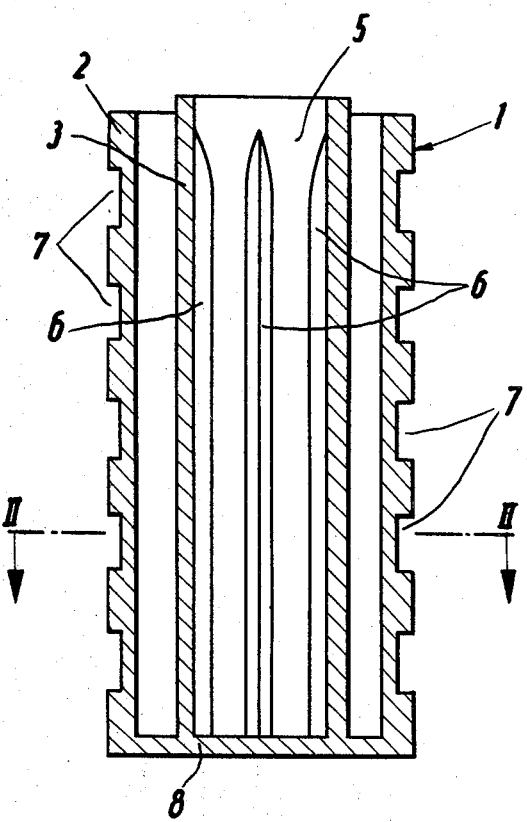
FIG. 1 is an axial section through an anchoring element according to the present invention.

The outer circumferential surface of the outer part 2 is provided with a plurality of recesses 7 which are circumferentially as well as longitudinally distributed and which alternate with projections, as is clearly visible in FIG. 1. The anchoring element 1 is introduced into a hole provided in an object to which the vibratory object is to be anchored, or in a support strcture or the like, and the recesses 7 with the ribs or projections therebetween serve to anchor the element more firmly in this hole. In the illustrated embodiment a transverse end wall 8 extends across the leading ends of the inner and outer parts 2 and 3, connecting the same with one another. The reference to leading ends here is intended to indicate that it is these ends with the end wall 8 which are introduced into the hole in the support structure or the like to which the vibratory object is to be anchored.

In the illustrated embodiment (compare FIG. 1) the trailing end of the inner part 3 extends axially beyond the trailing end of the outer part 2 so that the vibratory object which is being anchored to the inner part 3 will contact only the latter, but not the outer part 2, so as to positively preclude undesired transmission of vibrations to the outer part 2 and thereby to the object or support structure in which it is anchored.

It will be appreciated that a variety of modifications is possible in the exemplary illustrated construction without departing from the spirit and scope of the present invention. Thus, the elongation of the webs 4 may obviously be varied, just as the circumferential distribution and arrangement of the webs 4 may be changed, so as to provide for vibrations of different amplitudes which are to be damped. Also, the webs 4 need not be tangential to one of the parts, inasmuch as they may be tangential to both parts or, depending upon the cross-sectional outline of the parts, to neither of them.

It will be understood that by arranging the inner part concentrically within the outer part, as in the exemplary embodiment shown in the drawing, I make it possible to select the outer diameter of the outer part 2—assuming a relatively small diameter of this true which is to be introduced into the passage 53 of the inner part 3—so large that a secure and adequate retention of the outer part in the material of the support structure or the like is guaranteed even if the support structure or the like consists of highly porous material whose specific loading per unit area of the inner circumferential surface bounding the hole into which the anchoring element is introduced, must be as small as possible to prevent disintegration of the material of the support structure. Clearly, the relatively large surface area of the outer circumferential surface of the outer element 2 keeps such loading within an acceptable range even for materials of this type.

The provision of the elastically yieldable webs 4 not only serves damping purposes, but also makes it possible to correct errors of alignment or subsequent adjustment of the positioning of one object with reference to the other to which it is connected.

The anchoring element according to the present invention can advantageously be utilized in a great variety of applications, including all such applications where heretofore it was customary to use as anchoring elements wooden dowels or large outer diameter because of the small specific loading per unit area which was afforded by the use of such dowels. This has been customary in certain applications where for example the tracks of a railroad were to be connected to the associated railroad ties. The use of my novel anchoring element according to the present invention in such applications provides a considerably better damping effect and a more durable and reliable connection.

Evidently, while in the illustrated embodiment the webs 4 are of one piece with the inner and outer parts 3 and 2, respectively, it is possible to make the inner and outer parts separately from one another and to telescope them into one another and then suitably connect them. In this case it would of course be necessary to provide suitable abutment portions on one, the other, or both of the inner and outer parts to prevent axially shifting of one with reference to the other. The webs 4 could be produced separately, for example in view of a separate sleeve provided with the webs and capable of being placed about the inner part 3 with the outer free ends of the webs contacting the inner circumferential surface of the outer part 2 in such a construction. However, the inner webs 4 could also be integral with one of the parts and be so constructed as to properly engage the other part when the two are telescoped together. Furthermore, it is possible to fill or partially fill the spaces 9 (compare FIG. 2) with a suitable material for further damping of the vibrations. Such materials are well known in the art and need not be discussed in detail. Finally, it should also be pointed out that various different materials may be used for constructing my novel anchoring element. Depending upon the use to which the anchoring element is to be put, that is the stresses which the material of the anchoring element must be capable of absorbing, it is possible to manufacture the entire anchoring element from synthetic plastic material in a single manufacturing operation. Other materials are, however, also suitable and their selection will depend upon to a large extent upon the use which is to be made of the novel anchoring element.

It will be understood that each of the elements described above, or two or more together, may also find a useful application in other types of constructions differing from the types described above.

While the invention has been illustrated and described as embodied in anchoring element for anchoring two discrete objects together in vibration-damping manner, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An anchoring element, particularly for anchoring one discrete object to another in such a manner as to preclude the transmission of vibration therebetween, comprising a tubular outer part adapted to be rigidly connected with one of said objects and having an outer circumferential surface provided with a plurality of axially and circumferentially distributed anchoring projections; a tubular inner part telescoped with clearance into said outer part and adapted to be rigidly connected with the other of said objects; and a plurality of circumferentially distributed elastically yieldable webs extending across the clearance between said inner and outer parts tangentially with reference to at least one thereof and connecting said parts to one another with freedom of relative elastic movement, said webs being elongated in axial direction of said tubular parts and integral with both.

2. An anchoring element as defined in claim 1, said element being adapted to be introduced into a hole provided in said one object; said outer and inner parts being of substantially circular cross-sectional outline and each having a lead end and an open trailing end; and a transverse wall extending across said leading ends connecting said inner and outer parts against entry of contaminants ito said clearance in response to introduction of said element into said hole.

3. An anchoring element as defined in claim 1, said outer and inner parts each having a leading end and an open trailing end with the trailing end of said inner part projecting outwardly beyond said trailing end of said outer part so that said other object may be connected with said trailing end of said inner part without contacting said outer part.

References Cited

UNITED STATES PATENTS

| | | | |
|---|---|---|---|
| 3,067,546 | 12/1962 | Cuperus et al. | 52—701 X |
| 3,099,108 | 7/1963 | Kalkbrenner | 52—701 X |
| 3,186,475 | 6/1965 | Wilcoxon | 85—82 X |
| 3,235,244 | 2/1966 | Hein | 248—22 X |
| 3,269,717 | 8/1966 | Beck | 267—1 |

ROY D. FRAZIER, Primary Examiner

J. F. FOSS, Assistant Examiner

U.S. Cl. X.R.

52—701; 248—358; 267—1